United States Patent
Robart

(10) Patent No.: US 7,307,631 B2
(45) Date of Patent: Dec. 11, 2007

(54) COMPUTER GRAPHICS

(75) Inventor: Mathieu Robart, Bristol (GB)

(73) Assignee: STMicroelectronics Limited, Bristol (GB)

(*) Notice: Subject to any disclaimer, the term of this patent is extended or adjusted under 35 U.S.C. 154(b) by 660 days.

(21) Appl. No.: 10/811,481

(22) Filed: Mar. 26, 2004

(65) Prior Publication Data

US 2004/0257365 A1 Dec. 23, 2004

(30) Foreign Application Priority Data

Mar. 31, 2003 (EP) .................. 03252037

(51) Int. Cl.
*G06T 15/50* (2006.01)
*G06T 15/60* (2006.01)
*G09G 5/00* (2006.01)

(52) U.S. Cl. ............. 345/426; 345/422; 345/428; 345/582; 345/589

(58) Field of Classification Search ........ 345/418–428, 345/581–587, 589, 600, 606, 611–612, 501, 345/530, 541–545, 549, 552, 44, 48, 626, 345/207, 690, 63
See application file for complete search history.

(56) References Cited

U.S. PATENT DOCUMENTS 5,870,097 A 2/1999 Snyder et al.
5,953,076 A * 9/1999 Astle et al. .................. 345/584
6,252,608 B1 * 6/2001 Snyder et al. .............. 345/473
6,690,369 B1 * 2/2004 Smith et al. ................. 345/419
2002/0018063 A1 2/2002 Donovan et al.
2002/0022517 A1 2/2002 Tokuyama et al.
2003/0227599 A1 * 12/2003 Weissman et al. ............ 353/94
2004/0032409 A1 * 2/2004 Girard ......................... 345/426
2005/0017974 A1 * 1/2005 Hong et al. .................. 345/426

FOREIGN PATENT DOCUMENTS

WO WO 02/077882 10/2002

OTHER PUBLICATIONS

European Search Report, EP 03 252037, dated Jul. 21, 2003.

* cited by examiner

*Primary Examiner*—Wesner Sajous
(74) *Attorney, Agent, or Firm*—Gardere Wynne Sewell LLP

(57) ABSTRACT

An image is rendered which includes at least one light source, a first, shadow-casting object with a second, shadow-receiving object located on the side of the first shadow-casting object remote from said at least one light source. A shadow mask is generated which identifies for each of a plurality of pixels on the shadow receiving surface a grey level representing the intensity of shadow in each pixel. The intensity is determined utilizing the distance between the shadow-casting object and the shadow-receiving object.

29 Claims, 8 Drawing Sheets

COMPUTER GRAPHICS

PRIORITY CLAIM

The present application claims priority from European Patent Application No. 03252037.4 filed Mar. 31, 2003, the disclosure of which is hereby incorporated by reference.

BACKGROUND OF THE INVENTION

1. Technical Field of the Invention

The present invention relates to computer graphics and in particular, but not exclusively, to the rendering of an image including shadows in a graphics scene generated by a computer.

2. Description of Related Art

The field of computer graphics is a fast changing one, in which trade-offs are made between the quality of the images being produced and the processing power of the computing platform being used. The trade-off becomes even more acute when the images need to be displayed in real-time, for example in the video-gaming industry.

The rendering of an image on a computer screen entails vast amounts of processing. For example, it is necessary to have a so-called "global scene" (also knows as the "world scene") of the images to be displayed, and which will be hereinafter referred to as the scene. Broadly speaking, a scene can be thought of as a snap-shot or picture of the image to be displayed on the screen at any instant in time. As would be expected, a scene will itself comprise many different objects each having their own geometry. For example, a global scene might be the interior of a particular room in a house. The room might have windows, furniture, a TV, etc. Each object, for example TV, table, window will have a different geometry and will need to be created with the correct dimensions and co-ordinates on the screen in relation to the other images.

These objects are defined in three dimensions (3D), but will be rendered onto a two-dimensional (2D) computer screen. The technique for rendering a 3D object onto a 2D display involves firstly breaking down the 3D object into polygons defined by primitives. A popular primitive used is a triangle having three vertices. Thus, a 3D image can be transformed into a plurality of triangles each being defined by a unique set of vertices where each vertex would typically contain information relating to co-ordinates (x, y, z), color, texture and lighting. It should be understood that a fairly large storage area is needed to accommodate the vertex information.

Broadly speaking, the creation of an image on a computer graphics screen can be thought of as consisting of a geometry stage and a rendering stage. In existing systems, the geometry stage is responsible for transformation and lighting, in which the 3D object is converted into a number of polygons defined by a set of suitable primitives. Consider an interactive computer game where the user controls the motion of his player, as the player moves forward or backward the objects in the frame will need to be transformed so that they appear closer to and further away from the user, respectively.

In the rendering stage the transformed vertices are placed in a frame buffer in digital form. The frame buffer can in fact comprise a number of buffers, for example, a color buffer, depth buffer, stencil buffer, accumulation buffer. The frame buffer needs to be continuously managed and updated as the frame (or scene) changes. In the rendering stage the pixels are drawn and the frame buffer stores lighting, color and intensity information for each pixel that will be enabled. The digital frame data is then converted to an analog signal to be used to provide the final image for the actual 2D computer display.

The lighting of a scene, and of the objects within it, contributes largely to the overall success of the scene when displayed to the user. There are various methods that have been proposed for dealing with lighting.

The so-called "Shadow Map" method is a popular shadowing technique for determining whether surfaces in a scene are in shadow or illuminated (see, FIG. 1). The method is based on the idea of a two-pass rendering of the scene. In a first pass, the scene is rendered from the position of the light source 2. A depth buffer (the so-called classic zbuffer) stores the depth representing the distance to the object 4 closest to the light source 2 for each pixel. The content of the depth buffer is the actual shadow map 6, which is stored.

Then during a second pass the scene is rendered classically from the viewpoint of the camera 8. For this pass, the depth buffer holds as depths distances from the camera. To ensure that polygons are drawn correctly on the screen, each pixel of each polygon as it is considered is depth compared with any pixel already at a corresponding pixel location in the frame buffer. In one such arrangement, the depth buffer is the same size as the frame buffer, and is used to maintain depth data in the form of a depth value for each pixel that has been written to the frame buffer. When a new pixel is being considered, its depth value is compared with the depth value associated with any pixel that has already been written to the frame buffer at the new pixel's location. In the event that the new pixel is behind the old, then it is discarded because it will be obscured. Conversely, if the new pixel is in front of the old, the new pixel's depth value replaces that of the old pixel in the depth-buffer, and color data is retrieved from associated texture memory and written over the old pixel's color data in the frame buffer.

For each rasterized point, its world-space coordinates are generated (if not already stored) and converted into the light coordinate space. Its distance to the light (or depth) is compared with the corresponding depth stored in the shadow map. The result of the comparison will determine if the point is in shadow (P0) or illuminated (P1).

Let us consider the two points P0, P1 viewed from the camera. Using an inverse ModelView transformation, the world coordinates of P0 and P1 can be determined, and then transformed again in the light coordinate system. For each point, its distance to the light is compared to the depth stored in the corresponding pixel of the shadow map:

if the distance to the light is greater than the corresponding depth, the point is in shadow;

if the distance to the light is "near" the corresponding depth, the point is lit; and the distance to the light cannot be lower than the corresponding depth in theory.

In this example, d1 is the distance between P1 and the light. By construction, the depth of P1 is also equal to d1 and consequently P1 is in the light. In the other case, d0 (the distance between P0 and the light) is greater than d'0 (the depth of P0). Consequently, P0 is in shadow.

However, the disadvantage of the shadow map method is that it only provides information as to whether a point is in light or shadow and does not cater for soft shadows (i.e., differing shadow intensities).

There is a need in the art to allow soft shadows to be rendered, without hugely increasing the processing overhead.

SUMMARY OF THE INVENTION

According to one aspect of the invention there is provided a method of rendering an image comprising at least one light source, a first, shadow-casting object with a second, shadow-receiving object located on the side of the first shadow-casting object remote from said at least one light source. The method comprises generating a shadow mask which identifies for each of a plurality of pixels on the shadow receiving surface a grey level representing the intensity of shadow in each pixel, the intensity being determined utilizing the distance between the shadow-casting object and the shadow-receiving object.

According to another aspect of the invention there is provided a computer system for rendering an image comprising at least one light source, a first shadow-casting object with a second shadow-receiving object located on the side of the first shadow-casting object remote from said at least one light source. The computer system comprises a shadow mask memory in which is stored a shadow mask which identifies for each of a plurality of pixels on the shadow receiving object a grey level representing the intensity of shadow in each pixel, the intensity having been determined utilizing the distance between the shadow-casting object and the shadow-receiving object. Processing means utilizes the shadow mask to render the image by adjusting the texture of each pixel based on said grey level representing the intensity of shadow.

Another aspect of the invention provides an image rendering pipeline including a polygon identification stage and a pixel rendering stage. The pixel rendering stage comprises a rasterizer which rasterizes pixel parameters for each pixel, including a color parameter; a texture mapping stage which modifies said color parameter according to texture values. A shadow mask determination stage generates a shadow mask identifying for each of a plurality of pixels on a shadow receiving surface a grey level representing the intensity of shadow in each pixel, the intensity having been determined utilizing the distance between a shadow-casting object and the shadow-receiving object. The texture value is modulated using each grey level whereby soft shadows in the final image can be rendered.

Thus, the present invention makes use of the fact that the intensity of a cast shadow depends on the distance between the object that casts the shadow and the surface in shadow. In existing systems, no information about this geometry is retained at pixel level, but according to the following described embodiments of the present invention this distance information is deduced and is used by the rasterizer for rendering the image.

BRIEF DESCRIPTION OF THE DRAWINGS

A more complete understanding of the method and apparatus of the present invention may be acquired by reference to the following Detailed Description when taken in conjunction with the accompanying Drawings wherein.

DETAILED DESCRIPTION OF THE DRAWINGS

The following described embodiment of the invention rests on a technique for rendering an image which gives better information about the illumination of each pixel, according to the geometry of its projected area in the scene and the nature of the corresponding surface. Thus, instead of merely being able to tell whether a given point is in light or in shadow, the intensity of the shadow can be deduced and used to render a more realistic image, by allowing "soft shadows" to be rendered. The intensity of the shadow depends on the distance between the "shadow caster" and the "shadow receiver". The shadow caster is considered to be the first object in the light path from the light source under consideration. The shadow receiver is considered to be the next object in that path, that is the one which receives the shadow. This is sometimes referred to herein as the immediate second occlusion.

Figure 1:
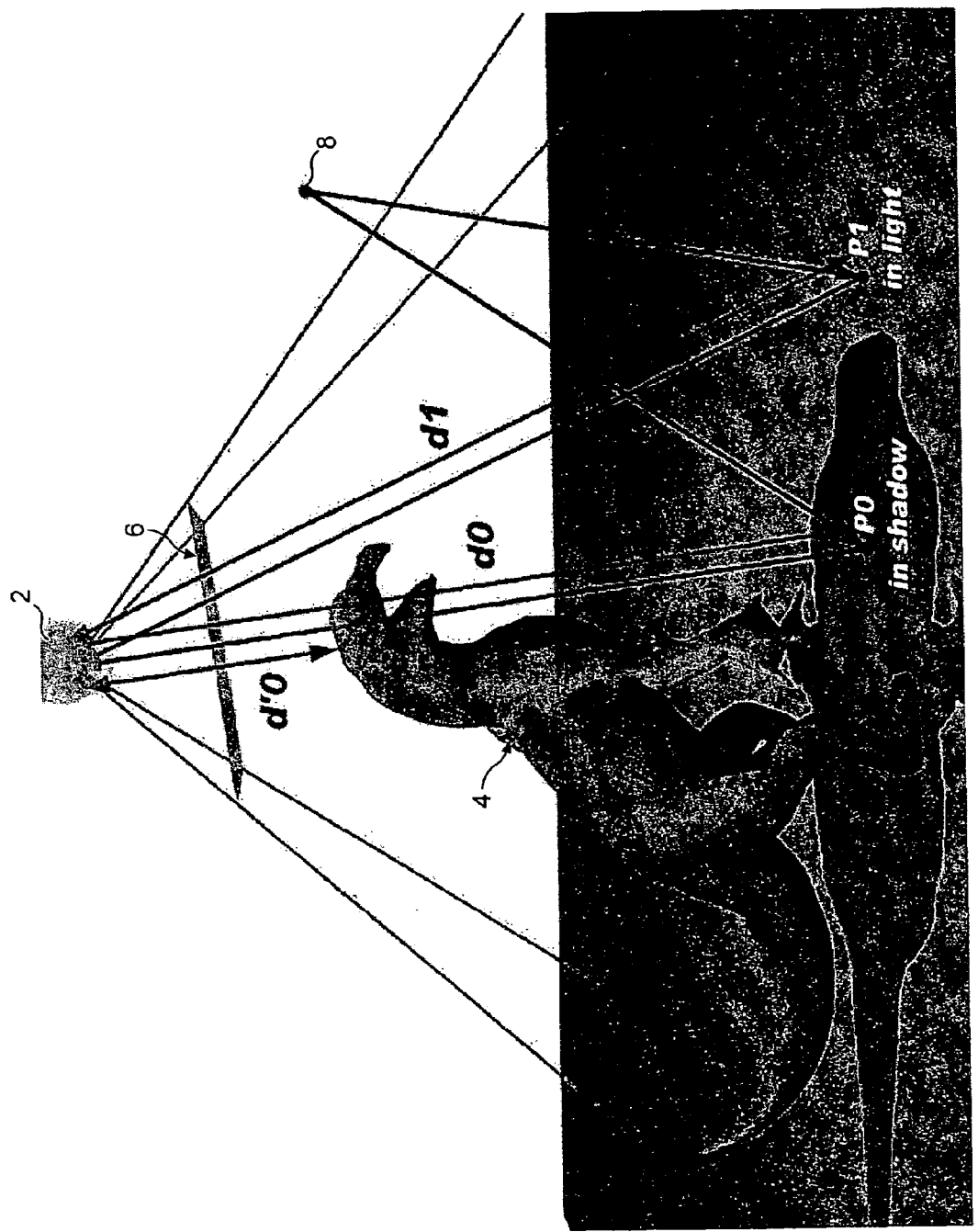
FIG. 1 is a graphics image illustrating shadow-map geometry.
Figure 2:
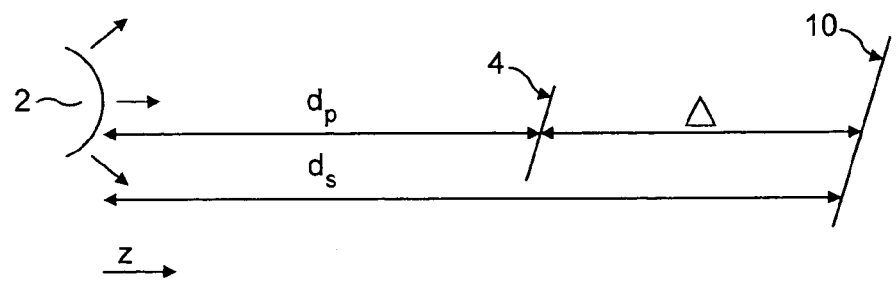
FIG. 2 is a simplified two-dimensional diagram denoting primary and secondary depths.

A simplistic two dimensional view of this is shown in FIG. 2. In FIG. 2, $d_p$ represents a primary depth, that is the distance to the object 4 closest to the light source 2, $d_s$ represents a secondary depth, that is the distance of the shadow receiver 10 from the light source, and z denotes the axis along which the depth values are taken. A primary depth buffer (232—FIG. 7) acts as a classic zbuffer. That is, it stores the depth representing the distance to the object (denoted by reference numeral 4 in FIG. 2) that is closest to the light source.

A secondary depth buffer (233) stores the depth of the immediate second occlusion (10), following the algorithm:

```
If  (z<=_primary_depth_buffer(x,y))
{
    secondary_depth_buffer(x,y) =
    primary_depth_buffer(x,y);
    primary_depth_buffer(x,y) = z;
}
else
    if(z<=secondary_depth_buffer(x,y))
        secondary_depth_buffer(x,y) = z;
```

In that algorithm, the value primary_depth_buffer(x,y) denotes the value of $d_p$ for the pixel at the x,y location. The value secondary_depth_buffer(x,y) denotes the value $d_2$ for the pixel at the x,y location.

Thus, for values of z up to $d_p$ (that is, points between the light source and the object 4), the primary depth buffer 232 holds the classic z value, and the secondary depth buffer 233 holds the initialization value, for example MAX_DEPTH. In this form, it is evident that there is no need to compute the difference between the value stored in the first and second buffers for points lying between the light source 2 and the closest object 4 because the secondary depth has not been written. There is no shadow receiver. However, for values of z exceeding $d_p$, that is points lying between the object 4 and the immediate second occlusion 10 (shadow receiver), the value which is held in the primary depth buffer remains at $d_p$ while the value that is held in the secondary depth buffer is z, the classic depth. Consequently, the difference Δ between the values held in the primary and secondary depth buffers provides the distance (if any) between the point in the light the object 4 and the shadow that it casts on the shadow receiver 10. This distance characterizes the intensity of the shadow and its determination allows soft shadows to be rendered.

Figure 3:
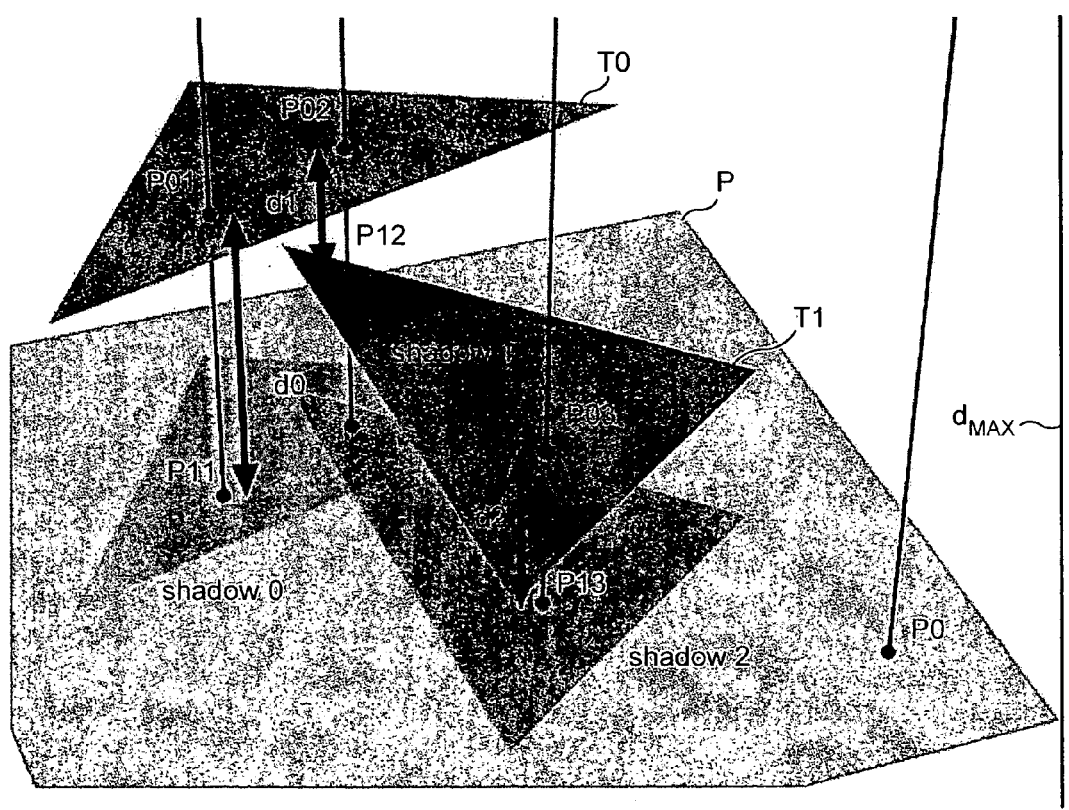
FIG. 3 is a geometric diagram illustrating intersection distances and shadows.

FIG. 3 represents a simple geometry configuration 3-D, where two triangles, triangle T0 and triangle T1 overlap and cast shadows on a polygon P. In this simple scene, different obstruction cases occur and create shadows:
1) triangle T0 casts shadows on the polygon P;
2) triangle T0 casts shadows on the triangle T1; and
3) triangle T1 casts shadows on the polygon P.

In order to evaluate the scene, a maximum distance $d_{max}$ is defined, with which other distances can be compared. The distance $d_{max}$ can be specified by a user for example, in order to limit the range of penumbra generated. Alternatively, this value can be automatically defined as the largest difference between the first and second depth buffer values (corresponding to the maximum distance between a shadow caster and the corresponding shadow receiver). A first distance $d_0$ is computed between an intersection point p01 in the plane of the triangle T0 and an intersection point p11 in the plane of the polygon P. This distance is relatively close to $d_{max}$, and the shadow produced will, as a consequence, be very light. The distance computed is the difference between the depth of p11 stored in the secondary depth buffer and the depth of p01 stored in the primary depth buffer. The depth of the polygon is treated as the depth of triangles: they are all objects.

A second distance $d_1$ is computed between a second point of intersection p02 on triangle T0 and a first point of intersection p12 on triangle T1. This distance $d_1$ is relatively small in comparison to $d_{max}$, and consequently the shadow cast on triangle T1 will be sharp and dark. To compute the second distance $d_1$, the distance from the light source to the intersection point p12 is held in the secondary depth buffer, and the distance from the light source to the intersection point p02 is held in the primary depth buffer.

A third distance $d_2$ is computed between a point of intersection p03 on triangle T1 on a point of intersection p13 on the polygon. This distance $d_2$ is also relatively small, generating a dark shadow. To compute the third distance $d_2$, the distance from the light source to the intersection point p13 is held in the secondary depth buffer and the distance from the light source to the intersection point p03 is held in the primary depth buffer.

Computation of the distances $d_1$ and $d_2$ result in the rendering of corresponding dark shadows, even if the distance between the light source and the first intersection point in each case is different. In particular, the distance between the light source and intersection point p02 is smaller than the distance between the light source and the intersection point p03 (considering the light source to be at approximately the distance $d_{max}$ from the plane of the polygon). However, notwithstanding this the shadows cast are dark in both cases. This is the fact in real life when a strong and distant light source such as the sun lights a scene.

The difference Δ is stored as part of the texture information in the frame buffer, such that the texture can then be processed in order to define the degree of shadow for each pixel. During a rendering pass, a simple look-up operation is utilized to render the penumbra, using the texture value as a mask. Moreover, by representing the distance Δ as part of the texture value, the results can be reused in subsequent passes at no cost. The mask constituted by the differences Δ is referred to herein as the shadow mask and its generation is discussed in more detail below.

Shadow Mask Generation

During the initialization process, the depth buffers are filled with the same value, MAX_DEPTH which is the maximum value that they can store (for example, 0xFFFFFFFF for 32 bit representation). So, if there are no second objects (that is no shadow receivers), no value is written into the secondary depth buffer and it remains initialized. Consequently, the Δ value is computed only when there is a difference to compute, that is when there are values in the primary and second buffers, different from the initialization value. For the same reason, the maximum and minimum are updated when a Δ value is computed. Thus, each cell of the primary and secondary depth buffers are processed together, producing a delta value Δ according to their difference:

If the corresponding secondary depth buffer cell secondary_depth_value(x,y) is not valid (still initialized to MAX_DEPTH), then:

delta=MAX_DEPTH

Else, the difference is stored:

Delta=secondary_depth_value(x,y)−primary_depth_value(x,y)

The minimum and maximum value of Δ is updated, only when a valid difference has been computed, i.e., different from MAX_DEPTH.

Once the difference between the primary and secondary depth buffers is computed, the shadow mask can be generated. This mask codes the intensity of the shadow in each pixel according to a level of grey. A simple process for "painting" a mask with the correct values is discussed below.

Figure 4:
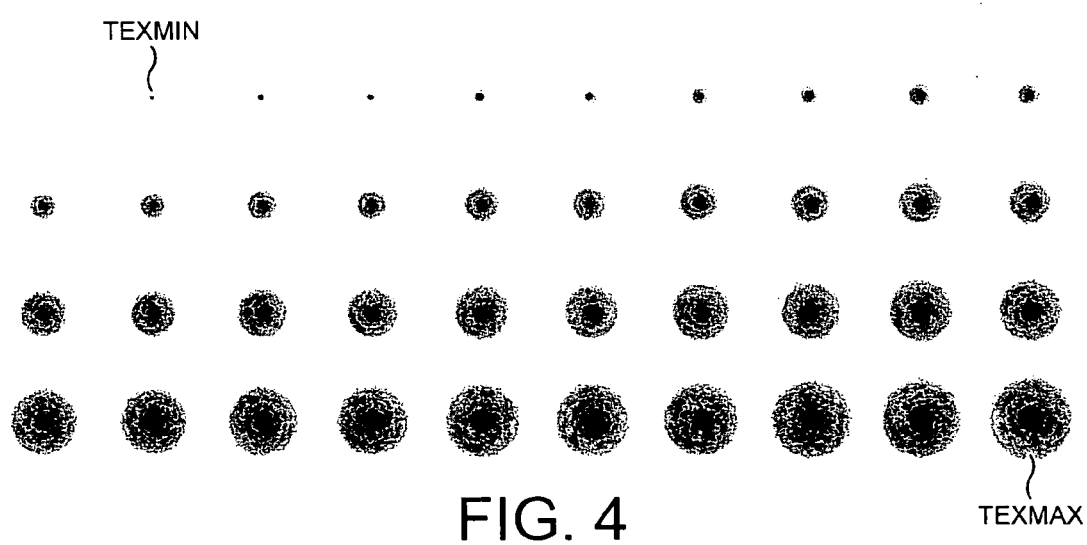
FIG. 4 is a diagram illustrating a hierarchy of textures.

A hierarchy of textures, each representing a point at a different level of "blur" is pre-generated (see FIG. 4).

For describing the shadow mask as a texture, the shadow mask itself takes the form of a floating-point memory surface 234, initialized to (1.0, 1.0, 1.0, 1.0). For each of its cells, the delta Δ previously generated determines the corresponding level of blur. The Δ value permits the index of the texture to be determined from the texture hierarchy, the index being used to simulate the level of blur at this pixel location. In the following equation, Tex_pixel is an index in the hierarchy of textures extending between TEXMIN and TEXMAX (see FIG. 4).

$$\text{Tex\_pixel} = \frac{(delta - min) * TEXMAX + (max - delta) * TEXMIN}{max - min}$$

where min and max are the minimum and maximum distance between a shadow caster and a shadow receiver, and TEXMIN and TEXMAX are the index of the first and last texture in the hierarchy.

If delta is different from MAX_DEPTH (indicating that there is indeed a shadow to cast), the pixels of the corresponding texture are copied into the shadow mask at the current location, following a blending process:

a local distance L1 is computed as the difference between the depth at the pixel location (corresponding to the centre of the texture) and the depth at the current pixel of the texture;

a second distance L2=L1−delta is computed; and these two distances, compared to a threshold, indicate if the current pixel of the texture is copied into the mask or not.

This algorithm permits to detect any disruption in the distance between the light receiving object 4 (the shadow caster) and the potential object in shadow (the surface 10 of the immediate second occlusion). If such a disruption is detected, then the corresponding points are in a penumbra zone, and its intensity depends on the distance between the shadow caster 4 and the shadow receiver 10.

Figure 5A:
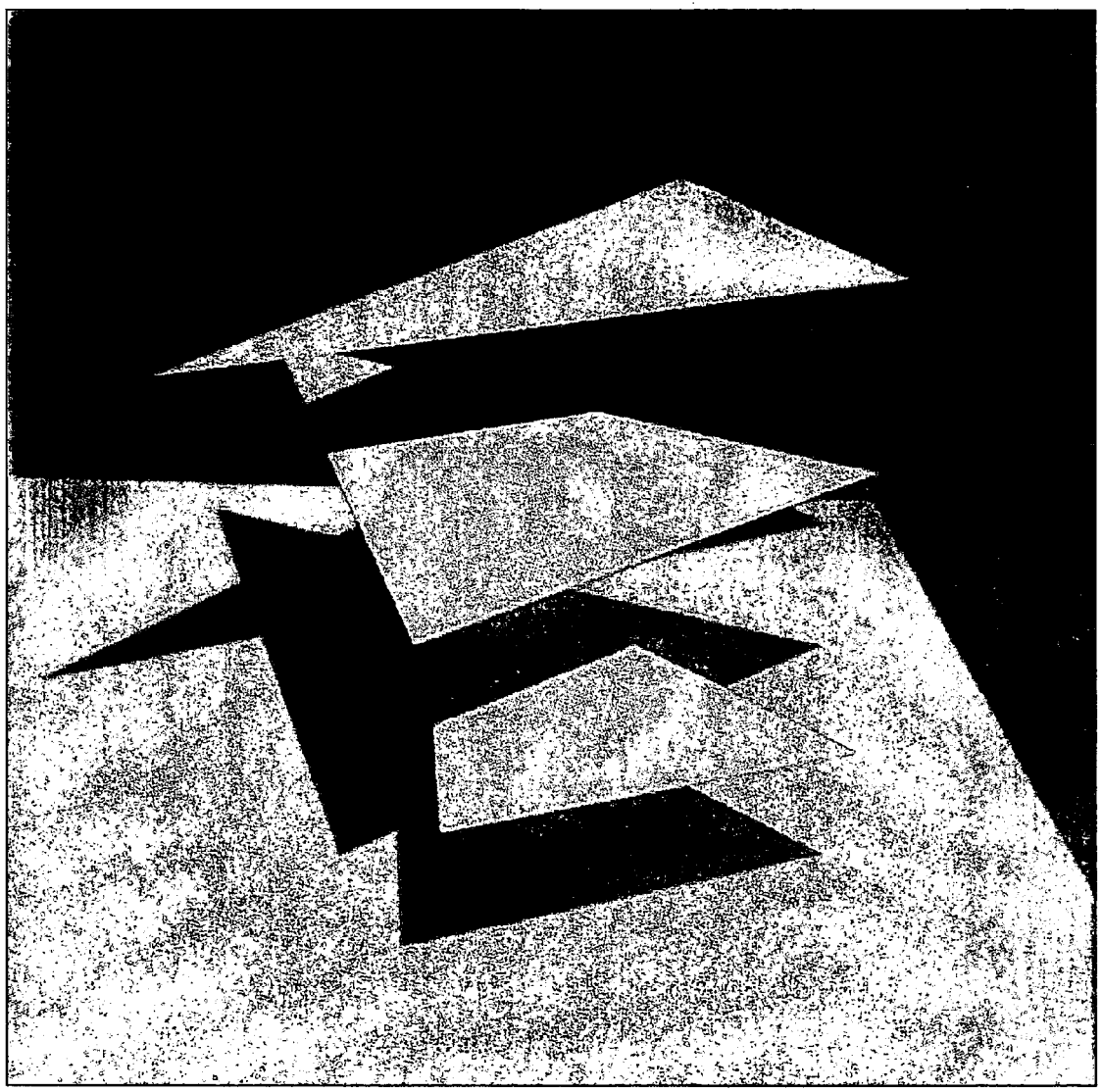
FIGS. 5A and 5B are images using a known shadow-map technique and a shadow-mask technique according to one embodiment of the invention.
Figure 5B:
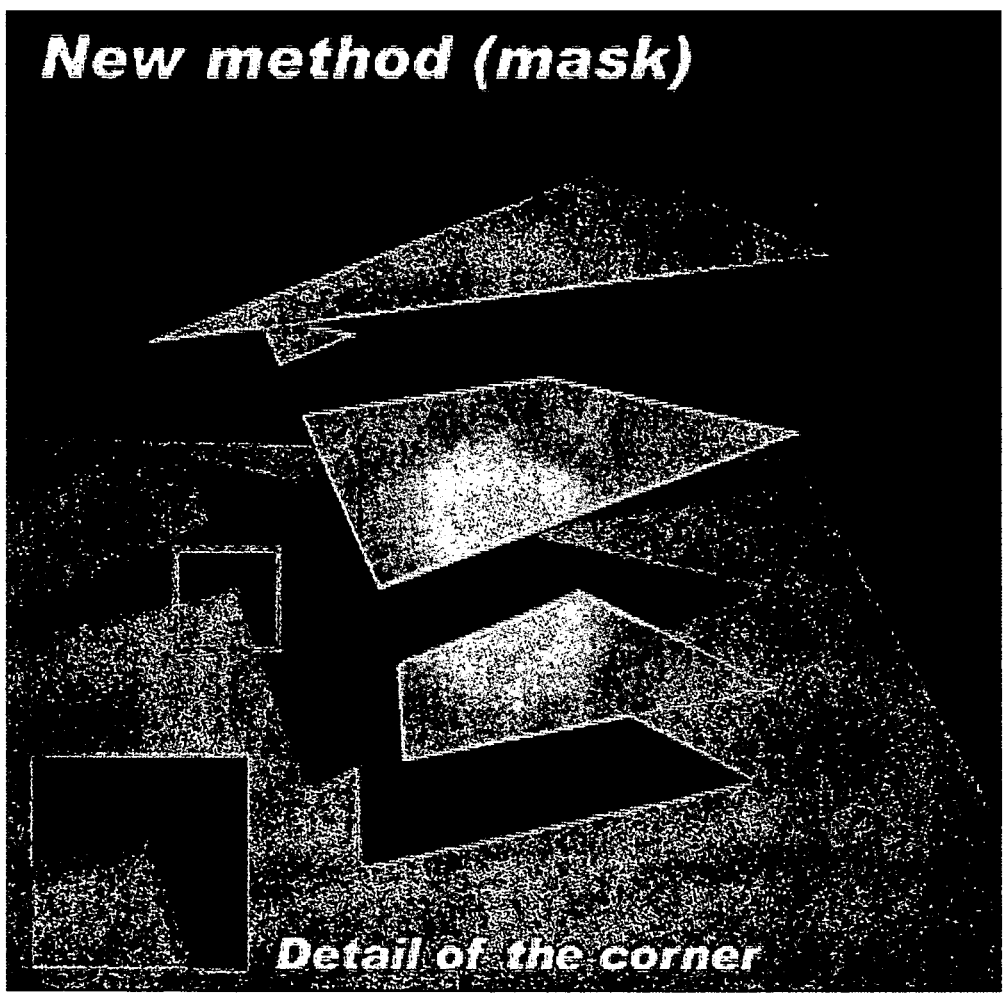

The approach generates more realistic results than the classic shadow map method. Compare FIG. 5A, representing the existing shadow cast method with FIG. 5B where a shadow mask as described above is utilized.

Figure 6:
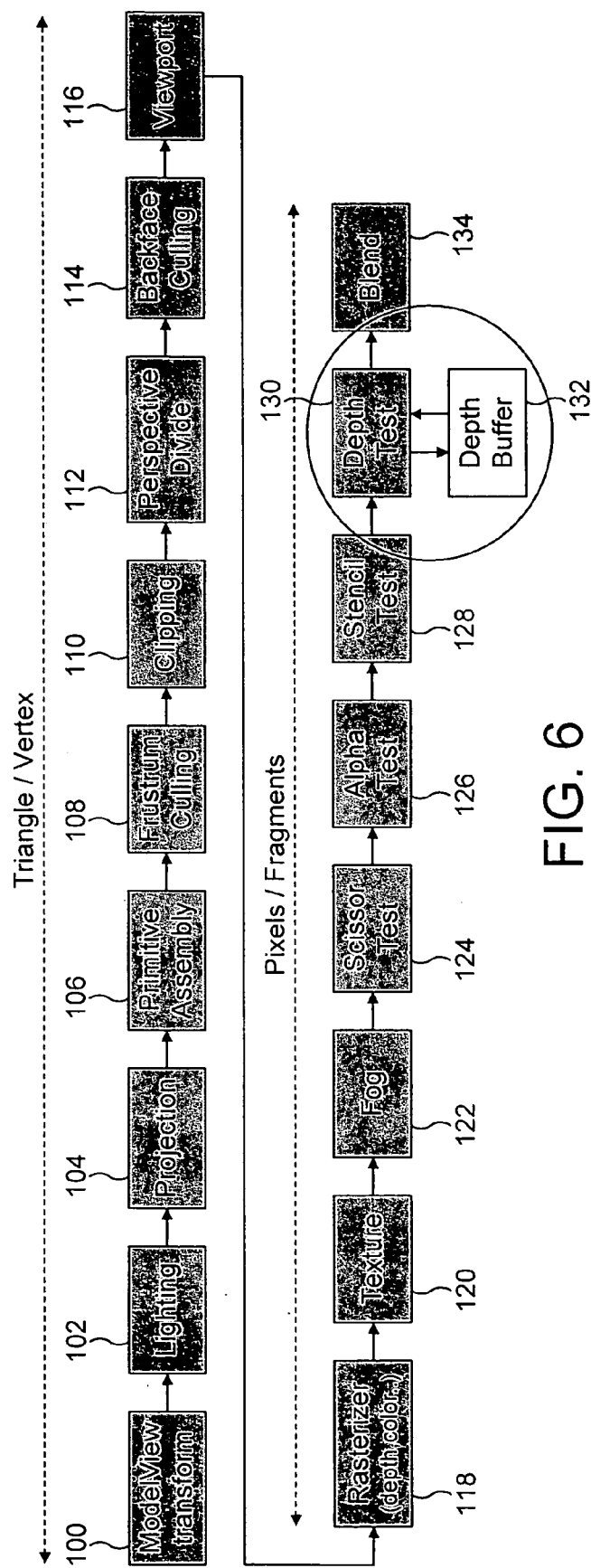
FIG. 6 is a schematic block diagram of a classic graphics pipeline.

FIG. 6 illustrates the architecture of a classic graphics pipeline. The architecture is illustrated using a number of connected blocks, each block representing a function in the pipeline. The top row of blocks relates to triangle/vertex processing, and the lower row of blocks relate to pixel/fragment processing. The stages of this pipeline are well understood in the art, and therefore only a brief description follows. In the pipeline, the geometry of the image is defined in a model view transform stage 100, lighting analysis stage 102 and projection analysis stage 104. Primitives, such as polygons (normally made up of triangles) are assembled in a primitive assembly stage 106. This is followed by a frustum culling stage 108 and a clipping stage 110. This is followed by a perspective divide stage 112 and a back face culling stage 114. Finally, the view port for the scene to be rendered is determined in a view port stage 116. Each primitive is supplied to the pixel/fragment processing pipeline, commencing at a rasterizer stage 118 which rasterizes the required pixel parameters, such as depth, color etc. The output of the rasterizer is supplied to a texture unit 120 which applies texture values to the rasterized pixels. The output of the texture unit is supplied to a fog unit 122 which computes a fog value based on the distance from the camera and applies the fog value to the texture mapped pixels. The texture and fog mapped pixels are then subject to a sequence of tests, including a scissor test 124, an alpha test 126, a stencil test 128 and a depth test 130. The scissor test, alpha test and stencil test are not discussed further herein. The depth test has already been explained earlier in relation to the production of a shadow map for identifying shadows in the image. The depth test is associated with a depth buffer 132 which is the classic zbuffer to which reference has already been made. The output of the depth test 130 is applied to a blending unit 134 which carries out a blending operation.

Figure 7:
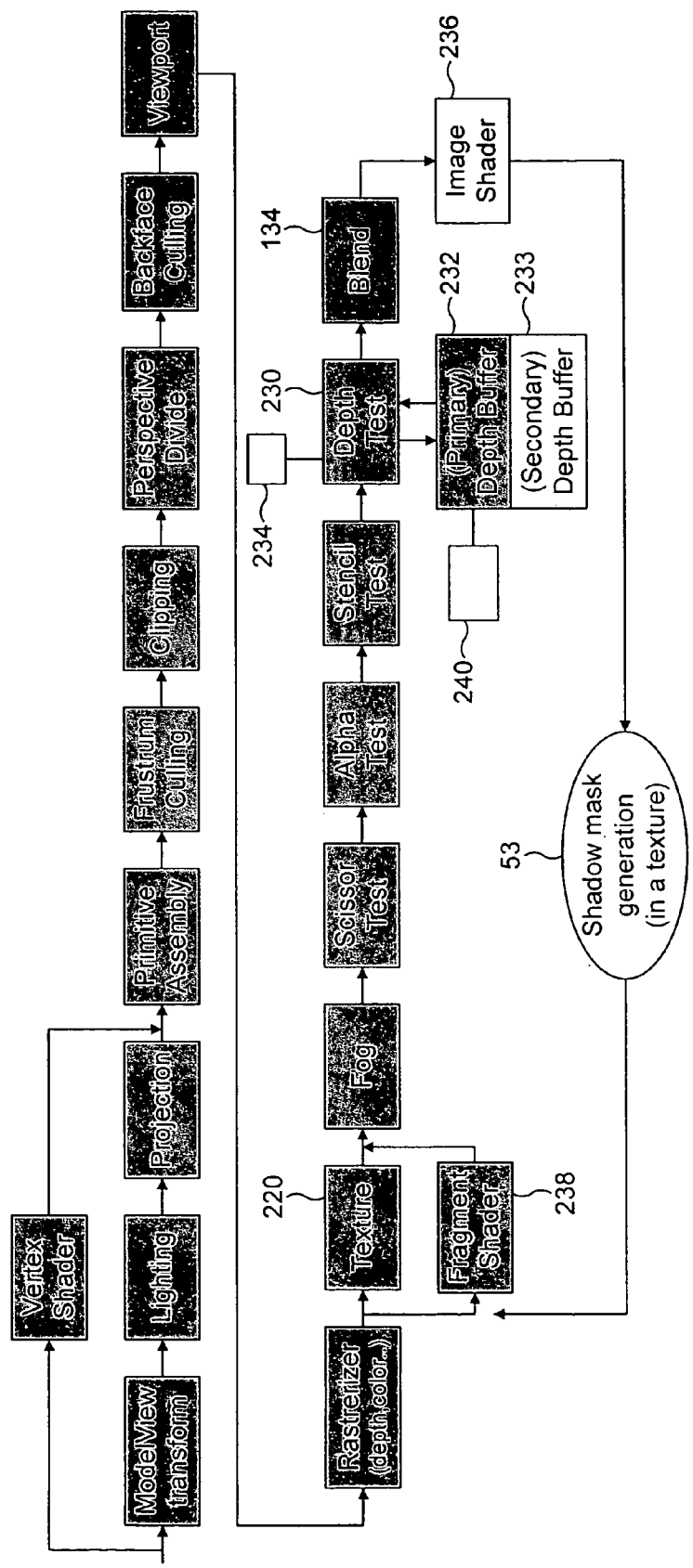
FIG. 7 is a schematic diagram of the parts of the pipeline which have been modified in accordance with an embodiment of the invention.

FIG. 7 illustrates a modified pipeline to implement the described embodiment of the present invention. In particular, the part circled in FIG. 6 is shown in FIG. 7 as a modified depth test 230 associated with a primary depth buffer 232 and a secondary depth buffer 233. In addition, the output from the blending unit 134 is applied to an image shader 236. A feedback from the output of the image shader is shown as an input to the texture mapping stage 220 (in the form of the shadow mask), where it is utilized in a fragment shader 238 (described later).

Figure 8:
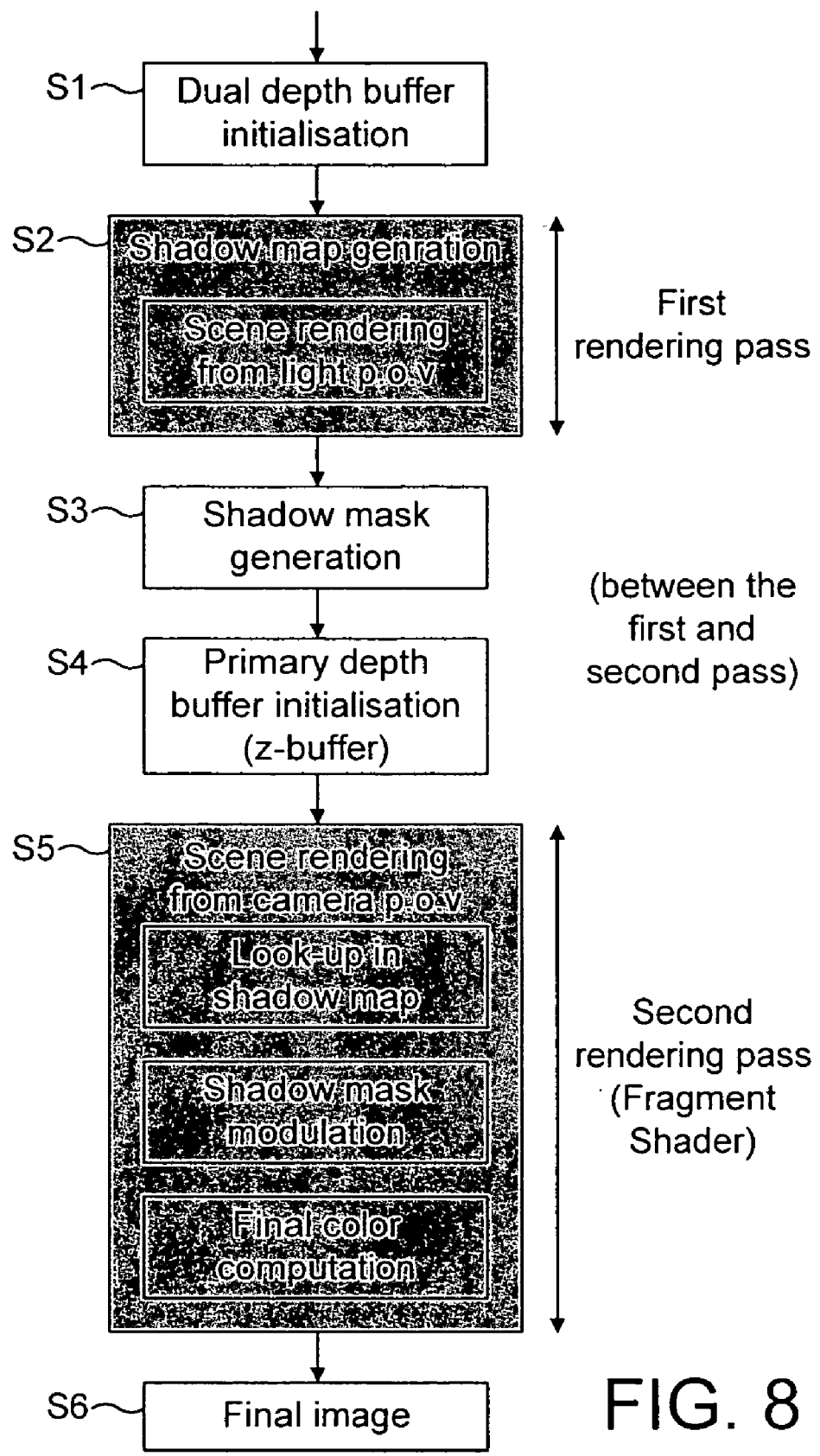
FIG. 8 is a flow chart illustrating a method of rendering an image in accordance with one embodiment of the invention.

FIG. 8 is a flow chart illustrating how the shadow mask can be utilized in a rendering procedure to render an image. Multiple passes are implemented in order to render the final picture, as follows:

a first pass for rendering the shadow map from the current light source;

generation of the shadow mask using the primary and secondary depth buffers; and a second pass for rendering the frame according to this light source from the camera point of view (p.o.v.) using the shadow mask.

This process is repeated for each light source.

The first step S1 illustrated in FIG. 8 is initialization of the dual depth buffers 232, 233. The primary depth buffer 232 is created in unsigned INT representation, for use as the shadow map buffer. The secondary depth buffer 233 is created as a secondary unsigned INT channel. The buffers are initialized as described above. In the subsequent stage S2, the scene is rendered from the light point of view and the shadow map is generated in the primary depth buffer. At step S3, the shadow mask is generated according to the shadow mask generation technique discussed above. Step S2 constitutes the first rendering pass, and step S3 is carried out after the first rendering pass before the second rendering pass to be described later. After generation of the shadow mask at step S3, the primary depth buffer is initialized for use as the classic zbuffer at step S4. The shadow map which was held in the primary depth buffer is moved to another buffer or memory store 240 so that it is not overwritten, because it is needed in the subsequent, second pass. Next, the camera is defined and the scene is rendered at step S5 from the camera point of view, which constitutes the second rendering pass.

At step S5, the following steps are accomplished for each pixel: A look up operation is performed in the shadow map to determine whether or not the point is in shadow. If it is in shadow, a soft shadow is generated using the shadow mask to modulate the texture value of the pixel, and then a final color computation is carried out using the color generated for the fragment by the rasterizer. Finally, at step S6, the result is saved.

The shadows, penumbra, colors, etc, generated by the fragment shader 238 use the shadow mask which has been generated at step S3 to provide soft shadows in the final image, using the textured hierarchy described above. The following data is used in the fragment shader of the second pass:

the shadow map;

the shadow mask;

the light model view matrix;

the light projection matrix;

the camera model view matrix;

the view port parameters;

the position of the light; and the color generated for the fragment by the rasterizer.

In one embodiment, in order to render the image, the shadow mask is used in the computation of a form factor in the following equation:

$$\frac{1.0}{\pi(X'^2 + Y'^2 + 1)^2} * ShadowMask(X, Y)$$

where X and Y are the x,y values of the pixel being rendered. The shadow value parameter of the shadow map (the contents of the primary depth buffer) is read:

$$z\_shadow = ShadowMap(X, Y)$$

and the difference between the depth in the shadow map and the actual difference between the light source and the point P''' which represents the position of a point in world space transformed into light space is computed:

Delta=|z−z_shadow|

If this difference is lower than a given threshold, the point is in light, otherwise it is in shadow. If the point is in light, the form factor is computed and used to modify the shadow value parameter in the shadow map by shadow_value plus form factor. In this way, the shadow values in the shadow map are modified according to the shadow mask for use in rendering of the image.

Although preferred embodiments of the method and apparatus of the present invention have been illustrated in the accompanying Drawings and described in the foregoing Detailed Description, it will be understood that the invention is not limited to the embodiments disclosed, but is capable of numerous rearrangements, modifications and substitutions without departing from the spirit of the invention as set forth and defined by the following claims.

What is claimed is:

1. A method of rendering an image comprising at least one light source, a shadow-casting object with a shadow-receiving object located on the side of the shadow-casting object remote from said at least one light source, the method comprising:

generating a shadow mask which identifies for each of a plurality of pixels on a shadow receiving surface of the shadow-receiving object a grey level representing the intensity of shadow in each pixel, the intensity being determined utilizing the distance between the shadow-casting object and the shadow-receiving object.

2. The method according to claim 1, comprising the steps of:

generating the distance between the shadow casting object and the shadow receiving surface by generating a primary depth being the distance between the light source and the shadow-casting object and a secondary depth being the distance between the light source and the shadow-receiving surface; and comparing the primary and secondary depths.

3. The method according to claim 2, wherein the primary depth is stored in a primary depth buffer and the secondary depth is stored in a secondary depth buffer.

4. The method according to claim 1, wherein each grey level is generated using a texture hierarchy having respectively different levels of blur.

5. The method according to claim 1, wherein a first pass of the image is implemented from the point of view of said at least one light source, prior to generating the shadow mask.

6. The method according to claim 5, wherein a second pass of the image is implemented from the point of view of a camera, said second pass being implemented after the step of generating the shadow mask.

7. The method according to claim 1, wherein the shadow mask is used to render the image by adjusting the color of each pixel in the rendered image based on said grey level representing the intensity of shadow.

8. A computer system for rendering an image comprising at least one light source, a shadow-casting object with a shadow-receiving object located on the side of the shadow-casting object remote from said at least one light source, the computer system comprising:

a shadow mask memory in which is stored a shadow mask which identifies for each of a plurality of pixels on a shadow receiving surface of the shadow-receiving object a grey level representing the intensity of shadow in each pixel, the intensity having been determined utilizing the distance between the shadow-casting object and the shadow-receiving object; and processing means for utilizing the shadow mask to render the image by adjusting the color of each pixel based on said grey level representing the intensity of shadow.

9. The computer system according to claim 8, comprising:

a primary depth buffer arranged to store a shadow map from a first pass comprising; for each of the plurality of pixels the distance between said at least one light source and the first shadow-casting object; and a secondary depth buffer arranged to store for each of a plurality of pixels the distance between said at least one light source and the shadow-receiving surface.

10. The computer system according to claim 9, comprising a shadow map memory into which the shadow map from the primary depth buffer is transferred for use in a second pass, so that the primary depth buffer can be initialized as a classic depth buffer for that second pass.

11. The computer system according to claim 8, comprising shadow mask generation means for generating shadow masks wherein each grey level is generated using a texture hierarchy having respectively different levels of blur.

12. The computer system according to claim 8, wherein the processing means includes a fragment shader for utilizing the shadow mask to adjust the color of each pixel in each of a plurality of image fragments.

13. An image rendering pipeline including a polygon identification stage and a pixel rendering stage, wherein the pixel rendering stage comprises:

a rasterizer which rasterizes pixel parameters for each pixel, including a color parameter;

a texture mapping stage which modifies said color parameter according to texture values; and a shadow mask determination stage which generates a shadow mask identifying for each of a plurality of pixels on a shadow receiving surface a grey level representing the intensity of shadow in each pixel, the intensity having been determined utilizing the distance between a shadow-casting object and the shadow-receiving object;

wherein the texture value is modulated using each grey level whereby soft shadows in the final image can be rendered.

14. A method for generating a shadow in an image of a shadow caster which is positioned between a light source and a shadow receiver, comprising:

calculating a distance between points on the shadow receiver and points on the shadow caster which are aligned with the light source;

creating a shadow mask from those calculated distances;

applying the shadow mask when rendering the image such that an image intensity of points on the shadow receiver depends on the calculated distance.

15. The method of claim 14 wherein the image intensity is greater for smaller calculated distances and smaller for greater calculated distances.

16. The method of claim 15 wherein an edge of the shadow is sharper for smaller calculated distances and blurrier for greater calculated distances.

17. The method of claim 14 wherein the shadow image intensity at each point on the shadow receiver is inversely related to the calculated distance for that point.

18. The method of claim 14 wherein calculating comprises:

determining a primary depth from the light source to the point on the shadow caster;

determining a secondary depth from the light source to the aligned point on the shadow receiver; and comparing the primary and secondary depths.

19. The method of claim 14 wherein image intensity for the shadow is represented by a gray level value.

20. The method of claim 19 wherein shadow color is based on gray level.

21. A computer system for rendering an image containing a shadow of a shadow caster which is positioned between a light source and a shadow receiver, comprising:

a memory storing a shadow mask including information identifying a distance between points on the shadow receiver and points on the shadow caster which are aligned with the light source; and an image rendering processor that renders an image of the shadow receiver to include the shadow with an image intensity at points on the shadow receiver that depends upon the calculated distances in the stored shadow mask.

22. The computer system according to claim 21, wherein the processor performs image fragment shading based on the stored shadow mask to adjust a color of each point on the shadow receiver for each image fragment.

23. The computer system of claim 21 wherein the image intensity is greater for smaller calculated distances and smaller for greater calculated distances.

24. The computer system of claim 21 wherein an edge of the shadow image is sharper for smaller calculated distances and blurrier for greater calculated distances.

25. The computer system of claim 21 wherein the shadow image intensity at each point on the shadow receiver is inversely related to the calculated distance for that point.

26. An image rendering pipeline, comprising:

a polygon identification stage; and a pixel rendering stage;

wherein processing through the pixel rendering stage is performed twice, a first pass for rendering a shadow map for a shadow caster positioned between a light source and a shadow receiver and creating a shadow mask which includes information identifying a distance between points on the shadow receiver and points on the shadow caster which are aligned with the light source, and a second pass for rendering the image from a selected point of view according to the light source such that an image intensity at points on the shadow receiver depends upon the calculated distances in the shadow mask.

27. The pipeline of claim 26 wherein the image intensity is greater for smaller calculated distances and smaller for greater calculated distances.

28. The pipeline of claim 26 wherein an edge of the shadow image is sharper for at points on the shadow receiver with smaller calculated distances and blurrier for greater calculated distances.

29. The pipeline of claim 26 wherein the shadow image intensity at each point on the shadow receiver is inversely related to the calculated distance for that point in the shadow mask.

* * * * *

UNITED STATES PATENT AND TRADEMARK OFFICE
CERTIFICATE OF CORRECTION

| | | |
|---|---|---|
| PATENT NO. | : 7,307,631 B2 | Page 1 of 1 |
| APPLICATION NO. | : 10/811481 | |
| DATED | : December 11, 2007 | |
| INVENTOR(S) | : Mathieu Robart | |

It is certified that error appears in the above-identified patent and that said Letters Patent is hereby corrected as shown below:

In the Specification:

At column 1, line number 6, please replace the number [03252037.4] with the correct number -- 03252037.1 --.

Signed and Sealed this
Thirteenth Day of September, 2011

David J. Kappos
*Director of the United States Patent and Trademark Office*